United States Patent [19]

Mechtersheimer

[11] Patent Number: 5,049,777

[45] Date of Patent: Sep. 17, 1991

[54] HIGH-POWER RADIATOR

[75] Inventor: Günter Mechtersheimer, Nussbaumen, Switzerland

[73] Assignee: Asea Brown Boveri Limited, Baden, Switzerland

[21] Appl. No.: 494,424

[22] Filed: Mar. 16, 1990

[30] Foreign Application Priority Data

Mar. 29, 1989 [CH] Switzerland ........................ 1140/89

[51] Int. Cl.[5] .......................... H01J 7/26; H01J 17/02; H01S 3/097; H05B 41/16

[52] U.S. Cl. ....................................... 313/35; 313/607; 313/634; 372/88; 315/248

[58] Field of Search ..................... 313/607, 35, 36, 42, 313/112, 234, 634; 372/88, 87, 86, 82; 315/248

[56] References Cited

U.S. PATENT DOCUMENTS

| | | | |
|---|---|---|---|
| 4,266,167 | 5/1981 | Proud | 315/248 |
| 4,935,933 | 6/1990 | Karube et al. | 372/82 X |
| 4,945,290 | 7/1990 | Eliasson et al. | 373/631 X |

FOREIGN PATENT DOCUMENTS

| | | |
|---|---|---|
| 0254111 | 1/1988 | European Pat. Off. . |

*Primary Examiner*—Sandra L. O'Shea

*Attorney, Agent, or Firm*—Oblon, Spivak, McClelland, Maier & Neustadt

[57] ABSTRACT

A high-power radiator for UV light comprises a quartz tube or glass tube (1) with electrodes (3, 4), which are arranged in pairs and are separated from one another in the circumferential direction. Together with the electrodes, the tube is partially embedded in a molding compound (2), and forms a module (6). A plurality of these modules can be assembled to form arbitrary radiator geometries.

12 Claims, 2 Drawing Sheets

HIGH-POWER RADIATOR

BACKGROUND OF THE INVENTION

1. Field of the Invention

The invention relates to a high-power radiator, especially for ultraviolet light, comprising a discharge space, which is filled with a fill-gas that emits radiation under discharge conditions, and of which the walls are formed by a tubular dielectric that is provided on its surface averted from the discharge space with electrodes, and comprising an alternating current source connected to the first and second electrodes for feeding the discharge.

In this regard, the invention relates to the prior art such as follows, for example, from EP-A 054 111 from U.S. Pat. Application 07/076 926 now U.S. Pat. No. 4,837,484 or also from EP Patent Application 88113393.3 dated 22 Aug. 1988 or U.S. Pat. Application 07/260,869 dated 21 Oct. 1988 now U.S. Pat. No. 4,945,290 or Swiss Patent Application 720/89 dated 27 Feb. 1989.

2. Discussion of Background

The industrial use of photochemical processes depends strongly upon the availability of suitable UV sources. Classical UV radiators deliver low to medium UV intensities at a few discrete wavelengths, such as, e.g. the low-pressure mercury lamp at 185 nm and especially at 254 nm. Really high UV powers are obtained only from high-pressure lamps (Xe, Hg), which, however, distribute their radiation over a sizeable waveband. The new excimer lasers have made available a few new wavelengths for basic photochemical experiments, but for reasons of cost they are probably only suitable at present in exceptional cases for an industrial process. In the EP patent application mentioned at the beginning, or also in the conference publication "Neue UV-und VUV Excimer-strahler" (New UV and VUV Excimer Radiators") by U. Kogelschatz and B. Eliasson, distributed at the 10th Lecture Meeting of the Society of German Chemists, Specialist Group on Photochemistry, in Würzburg (FRG) 18–20 Nov. 1987, there is a description of a new excimer radiator. This new type of radiator is based on the principle that excimer radiation can also be generated in silent electrical discharges, a type of discharge which is used on a large scale in ozone generation. In the current elements, which are present only briefly (<1 microsecond), of this discharge, rare gas atoms are excited by electron impact, and these react further to form excited molecular complexes (excimers). These excimers live only a few 100 nanoseconds, and upon decay give their bond energy off in the form of UV radiation.

The construction of such an excimer radiator corresponds as far as the power generation largely to a classical ozone generator, with the essential difference that at least one of the electrodes and/or dielectric layers delimiting the discharge space is transparent to the radiation generated.

The above-mentioned high-power radiators are distinguished by high efficiency and economic construction. and enable the creation of large-area radiators of great size, with the qualification that large-area flat radiators do require a large technical outlay. By contrast, in the irradiation of plane areas with round radiators a not inconsiderable proportion of the radiation is not utilized due to the shadow effect of the internal electrodes.

SUMMARY OF THE INVENTION

Starting from the prior art, it is the object of the invention to create a high-power radiator, especially for UV or VUV radiation, which is distinguished in particular by high efficiency, is economic to manufacture and enables construction of large-area radiators of a very great size.

In order to achieve this object with a high-power radiator of the generic type mentioned at the beginning, it is provided according to the invention that the electrodes are constructed as metal strips or metal layers, which run in the longitudinal direction of the tube and are separated from one another spatially in the circumferential direction, one electrode being connected to one terminal and the other electrode being connected to the other terminal of the alternating current source.

With radiator elements constructed in this way it is possible to build up large-area radiators in which arbitrary geometries can be assembled from mutually identical or similar discharge tubes which are selfcontained in each case. Electrical contacting of the individual elements takes place laterally on the outside of the tubes, so that light emission is scarcely obstructed. By providing the outside of the tubes with a partial mirror coating the power/space ratio of the radiation generated can be improved.

The advantages of the invention are as follows: simple and cost-effective realization of the closed discharge volume is possible. Similar basic elements (tubes) for all geometries are easily realizable, as are large areas through an appropriate number of tubes.

Good stability of the discharge volume in conjunction with the use of relatively robust tubes of small diameter.

By virtue of the generally large number of tubes, which are self-contained in each case, the failure of individual elements (e.g. because of contamination of the gas or of the quartz surface, leaks) is less critical The entire arrangement can cover a wide wavelength spectrum, by using tubes with different gas fillings. For the individual tubes, it is necessary to take only precisely that (quartz) quality which is necessary or optimum for the transmission of the radiation generated. Depending upon the desired wavelength spectrum, this can lead to substantial savings in material costs.

The light is coupled out from the tubes at a location which is scarcely affected by the discharge. No transparent electrodes are necessary.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
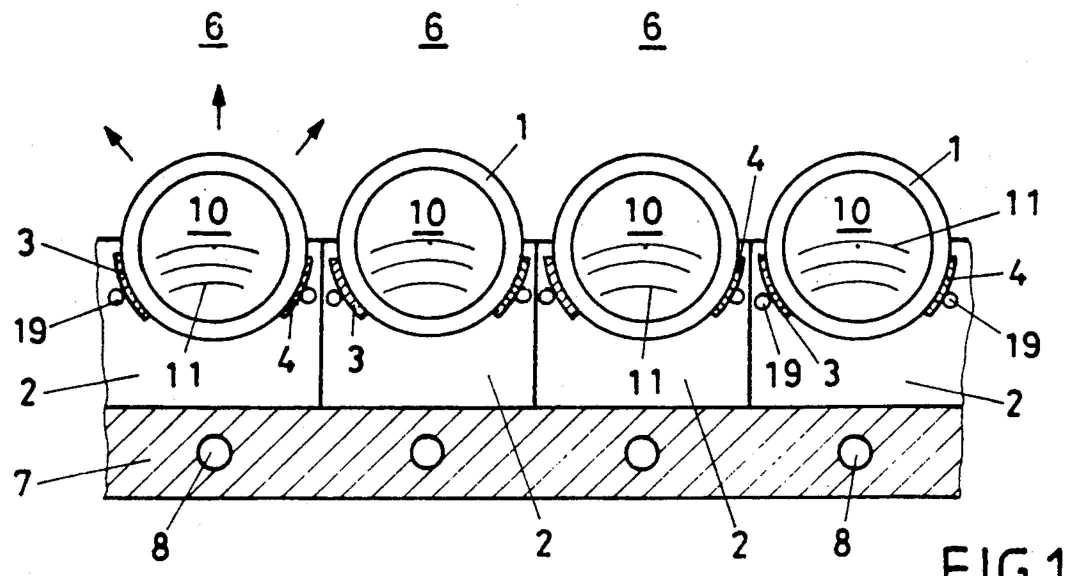
FIG. 1 shows a first illustrative embodiment of a high-power radiator with a plurality of adjacent circular dielectric tubes, in cross-section.

In FIG. 1, tubes 1 made of dielectric material, especially glass or quartz, are each embedded approximately half-way in a molding compound 2 made of insulating material, e.g. silicone rubber. Each tube 1 is provided with two strip-shaped metallic coatings 3 and 4 each as an electrode, which run in the longitudinal direction of the tube and are separated from one another in the circumferential direction. These consist, e.g., of vapor-deposited aluminum and act simultaneously as reflectors. The metallic coatings 3, 4 are situated entirely inside the molding compound. The electrical contacting takes place laterally on the outside of the tubes 1, e.g. through contact elements 5 (FIG. 2), which have also been cast in, and past which the tubes 1 project in the longitudinal direction of the tubes, the contact elements 5 of each electrode 3 or 4 being located in each case at the opposite tube end.

Each module 6 consisting of a tube 1 with electrodes 3, 4 and contact elements and molding compound is arranged packed side by side on a carrier plate 7. The carrier plate can be directly or indirectly cooled with a coolant which is led through cooling bores 8. Another possibility of cooling consists in also casting in cooling tubes 19 which touch the metallic coatings. As emerges from the diagrammatic top view of FIG. 2, the individual radiators are fed from an alternating current source 9, of which the terminals are alternately connected at the two tube ends to the mutually directly adjacent contact elements 5, which are connected to one another.

The tubes 1 are sealed at both ends. The interior of the tubes, the discharge space 10, is filled with a gas/gas mixture emitting radiation under discharge conditions. The alternating current source 9 basically corresponds to those such as are employed to feed ozone generators. Typically, it supplies an adjustable alternating voltage of the order of magnitude of several 100 volts to 20,000 volts with frequencies in the range of industrial alternating current up to a few 1000 kHz—depending upon the electrode geometry, the pressure in the discharge space and the composition of the fill-gas.

The fill-gas is e.g. mercury, rare gas, rare gas-metal vapor mixture, rare gas/halogen mixture, as the case may be with the use of an additional further rare gas, preferably Ar, He, Ne, as buffer gas.

Depending upon the desired spectral composition of the radiation, a material/material mixture can be used in this process according to the following table:

| Fill-gas | Radiation |
|---|---|
| Helium | 60–100 nm |
| Neon | 80–90 nm |
| Argon | 107–165 nm |
| Argon + fluorine | 180–200 nm |
| Argon + chlorine | 165–190 nm |
| Argon + krypton + chlorine | 165–190, 200–240 nm |
| Xenon | 160–190 nm |
| Nitrogen | 337–415 nm |
| Krypton | 124, 140–160 nm |
| Krypton + fluorine | 240–255 nm |
| Krypton + chlorine | 200–240 nm |
| Mercury | 185, 254, 320–370, 390–420 nm |

-continued

| Fill-gas | Radiation |
|---|---|
| Selenium | 196, 204, 206 nm |
| Deuterium | 150–250 nm |
| Xenon + fluorine | 340–360 nm, 400–550 nm |
| Xenon + chlorine | 300–320 nm |

In addition, a whole series of further fill-gases are candidates:

a rear gas (Ar, He, Kr, Ne, Xe) or Hg with a gas or vapor of $F_2$, $I_2$, $Br_2$, $Cl_2$ or a compound which, in the discharge, splits off one or a plurality of atoms F, I, Br, or Cl;

a rear gas (Ar, He, Kr, Ne, Xe) or Hg with $O_2$ or a compound which, in the discharge, splits off one or a plurality of O atoms;

a rare gas (Ar, He, Kr, Ne, Xe) with Hg.

In the silent electrical discharge which forms, the electron energy distribution can be set optimally by the thickness of the dielectrics and their characteristics of pressure and/or temperature in the discharge space.

Upon the application of an alternating voltage between the electrodes 3 and 4, a plurality of discharge channels 11 (partial discharges) forms in the discharge space 10. These interact with the atoms/molecules of the fill-gas, and this finally leads to UV or VUV radiation.

Figure 3:
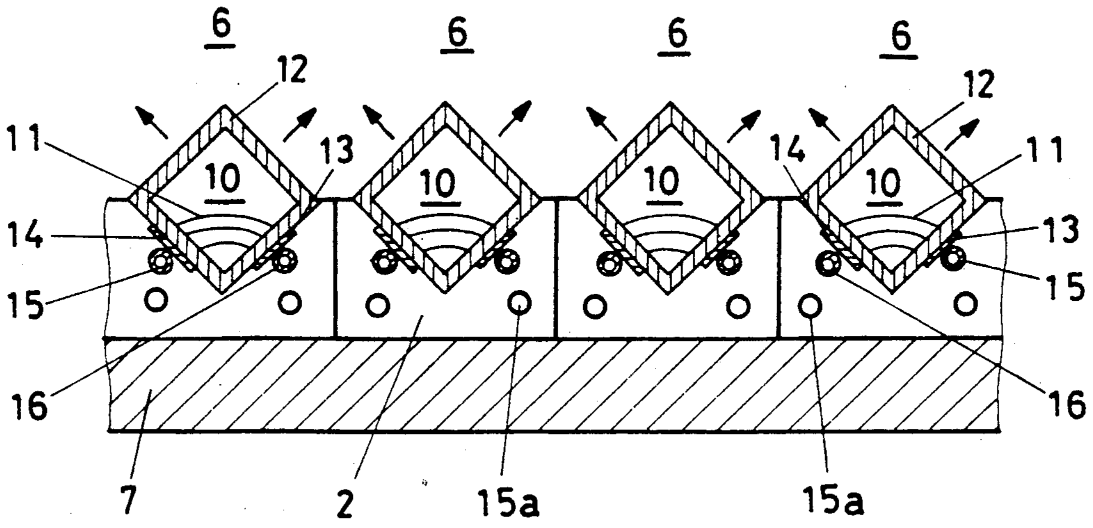
FIG. 3 shows an embodiment of a flat radiator having dielectric tubes of rectangular profile, which are placed on edge, and cooled electrodes.

Instead of dielectric tubes 1 of circular cross-section, it is also possible to use glass tubes or quartz tubes with different geometries, e.g. tubes of rectangular profile. FIG. 3 illustrates a variant carrying tubes 12 of square cross-section, which are placed on edge and embedded in the molding compound 2 as far as the neighbouring edge. Here, as a departure from the embodiment according to FIG. 1, the electrodes 13, 14 are constructed not as strip-shaped metallic coatings but as sheetmetal strips which have also been cast in the moulding compound 2. This measure can, of course, also be adopted with the arrangement according to FIG. 1. In addition, cooling tubes 15, 16, through which a coolant can be led, are attached to the sides of the sheet-metal strips 13, 14 which are averted from the tubes 12. If a non-conducting cooling liquid is used, tubes 15, 16 consisting of metal can share in taking over the function of electrodes 13, 14, and dedicated sheet-metal strips 13, 14 are then dispensable. In this way, cooling of the radiator modules via the carrier plate 7, on which the modules 6 are attached in tightly packed rows next to one another, can—but need not—be eliminated. A further possibility of cooling which can also be applied in addition consists in providing cooling channels, e.g. by also casting in tubes 15*a*, which channels run in the molding compound in the longitudinal direction of tubes.

Figure 4:
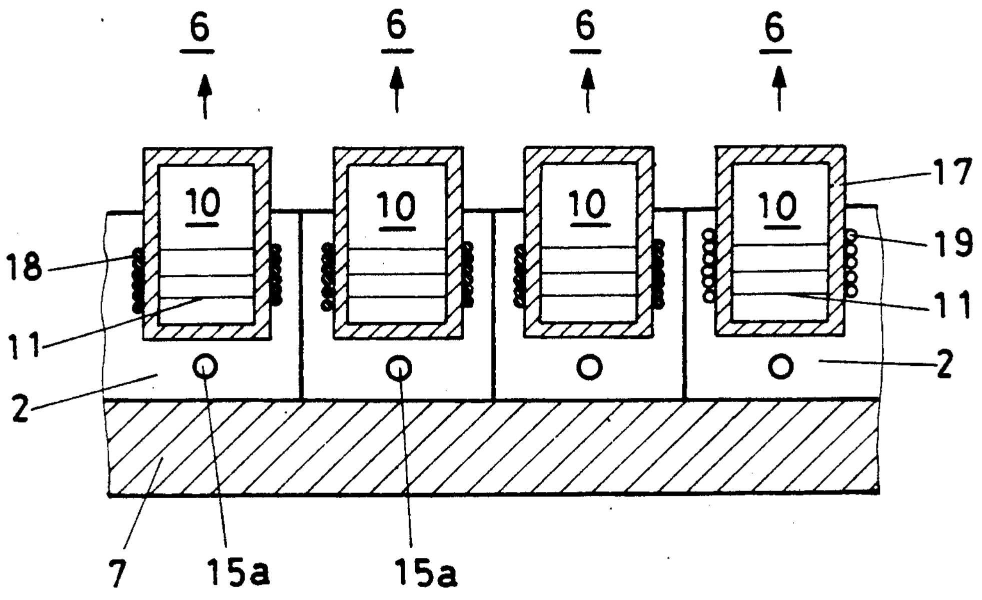
FIG. 4 shows an embodiment of a flat radiator analogous to FIG. 3, but having dielectric tubes of rectangular profile which are placed on a flat side, and wire electrodes.

In FIG. 4, dielectric tubes 17 made of glass or quartz of rectangular profile are embedded on edge into the molding compound. Illustrated in this variety is a further possibility for constructing the electrodes, to be precise wires 18 which are also cast into the molding compound 2, are closely adjacent and run in the longitudinal direction of the tubes. In a manner similar to FIG. 3, instead of wires it is possible to use thin metal tubes 19 through which a non-conducting cooling liquid can be led, as is illustrated in the right-hand module of FIG. 4.

Figure 2:
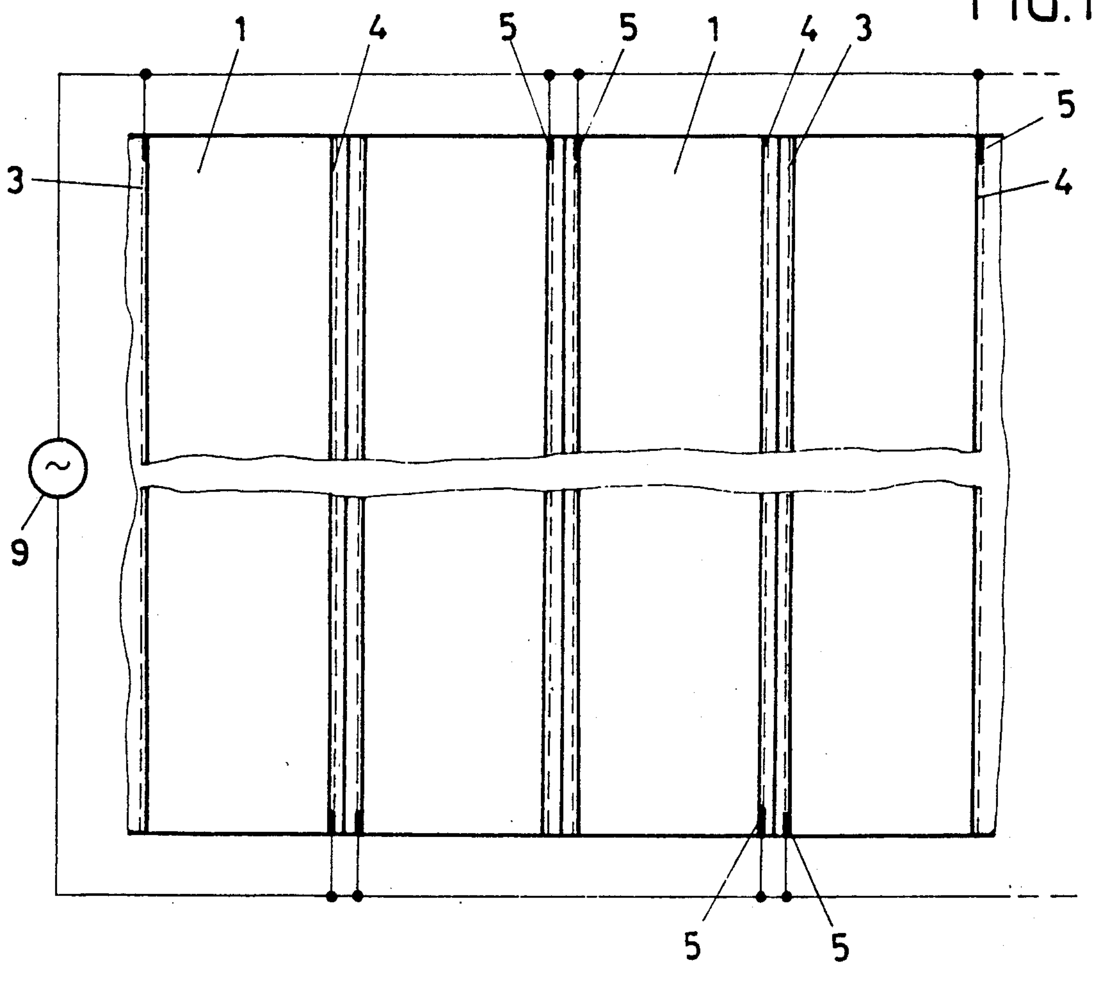
FIG. 2 shows a simplified top view of the radiator according to FIG. 1, in order to explain the electrical feed.

In the embodiments according to FIGS. 3 and 4, the electrical connection of the modules 6 to one another, and their connection to the alternating current source 9 take place in a manner similar to FIG. 2.

It goes without saying that in addition to dielectric tubes of round or rectangular cross-section, it is also possible to use such as have other forms of crosssections, sections, e.g. hexagonal. Again, the carrier plate 7 can be curved in one direction, e.g. in the form of a circular arc, or the modules are arranged on the inside or outside of a tube.

In order to generate UV or VUV light, which covers a wide wavelength spectrum, the tubes of the individual modules 6 can be filled with different gas fillings/gas pressure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A high-power radiator, especially for ultraviolet light, comprising a discharge space (10), which is filled with a fill-gas that emits radiation under discharge conditions, of which the walls are formed by a dielectric tube (1; 12; 17), which is transparent to radiation and is provided on its surface averted from the discharge space with first and second electrodes (3, 4; 13, 14; 18), and comprising an alternating current source (9) for feeding the discharge, wherein the electrodes are constructed as metal strips (13, 14), metal wires (18) or metal coatings (3, 4), which run in the longitudinal direction of the tubes and are separated from one another spatially in the tubular circumferential direction, one electrode of each tube being connected to one terminal and the other electrode being connected to the other terminal of the alternating current source (9), wherein the dielectric tubes (1; 12; 17) are partially embedded in the electrically insulating molding compound (2).

2. The high-power radiator as claimed in claim 1, wherein in the case of strip-shaped (13, 14) or wire-shaped electrodes (18) these are inserted in the molding material (2), or are also cast into the latter.

3. The high-power radiator as claimed in any one of claims 1 or 2, wherein cooling channels (15, 15*a*) are embedded in the molding compound (2).

4. The high-power radiator as claimed in any one of claims 1 or 2, wherein cooling devices (15, 16; 19), which are in direct thermal contact with the electrodes, are assigned to the electrodes (3,4; 13,14; 18).

5. The high-power radiator as claimed in claim 3, wherein in the case of strip-shaped electrodes (13, 14), the cooling device are constructed as cooling tubes (15, 16) connected to the electrode.

6. The high-power radiator as claimed in claim 1, wherein the electrodes are constructed as cooling channels (15,16; 19).

7. The high-power radiator as claimed in any one of claims 1, 2 or 6 wherein a common base plate (7), which can be cooled either indirectly or directly, is assigned to a plurality of radiators (6).

8. The high-power radiator as claimed in claim 3, wherein the electrodes are constructed as cooling channels (15, 16; 19).

9. The high-power radiator as claimed in claim 3, wherein a common base plate (7), which can be cooled either indirectly or directly, is assigned to a plurality of radiators (6).

10. The high-power radiator as claimed in claim 4, wherein a common base plate (7), which can be cooled either indirectly or directly, is assigned to a plurality of radiators (6).

11. The high-power radiator as claimed in claim 5, wherein a common base plate (7), which can be cooled either indirectly or directly, is assigned to a plurality of radiators (6).

12. The high-power radiator as claimed in claim 8, wherein a common base plate (7), which can be cooled either indirectly or directly, is assigned to a plurality of radiators (6).

* * * * *